United States Patent [19]

Burke, Jr.

[11] Patent Number: 5,405,640
[45] Date of Patent: Apr. 11, 1995

[54] PROCESS OF VACUUM TREATING ONIONS

[76] Inventor: Jerry A. Burke, Jr., 2541 Stratford Rd., Richmond, Va. 23225

[21] Appl. No.: 196,531

[22] Filed: Feb. 15, 1994

[51] Int. Cl.$^6$ .............................................. A23L 1/015
[52] U.S. Cl. .................................... 426/615; 426/386; 426/486; 426/518
[58] Field of Search ................ 426/386, 486, 615, 518

[56] References Cited

U.S. PATENT DOCUMENTS

| | | | |
|---|---|---|---|
| 3,607,316 | 9/1971 | Hume | 426/640 |
| 3,717,472 | 2/1973 | Strobel | 426/386 |
| 3,894,157 | 7/1975 | Gottlieb | 426/228 |
| 3,997,685 | 12/1976 | Strobel | 426/594 |
| 4,034,118 | 7/1977 | Martin | 426/431 |
| 4,361,586 | 11/1982 | Meinke | 426/486 |
| 4,741,914 | 5/1988 | Kimizuka et al. | 426/537 |

*Primary Examiner*—Helen Pratt
*Attorney, Agent, or Firm*—Norman B. Rainer

[57] ABSTRACT

Onions are subjected to a vacuum treatment to remove lachrymator compounds and compounds that impart harsh taste. The resultant onion product, preferably in sliced form, has a much sweeter taste. The onions are preferably Vidalia onions.

2 Claims, No Drawings

PROCESS OF VACUUM TREATING ONIONS

BACKGROUND OF THE INVENTION

1. Field of the Invention

This invention concerns a method for diminishing the pungent aroma characteristics of onions, and further concerns the resultant onion products.

2. Description of the Prior Art

Onions are a major food commodity in many countries. Various species of onion are known, having different taste and aroma characteristics. In general however, it is common for onions to contain volatile lachrymator compounds and compounds which give rise to a pungent or spicy taste sensation.

In times past it was possible to purchase so-called sweet onions year around. By this is meant onions having a sufficiently mild flavor that could be used in salads, sandwiches, and similar applications without overwhelming the flavor of the other ingredients. More recently, however, it has become difficult to obtain this preferred type of onion. To the contrary, most of the onions which are now obtainable during the cold months on a commercial basis are characterized by an extremely hot flavor.

Certain species of onions, for example Vidalia onions grown in a small area of the state of Georgia, are especially prized for their mild flavor and aroma. However, these onions are only available from May through September. Upon ageing, there is an increase in compounds such as propionaldehyde which increase lachrymator characteristics and impart a harsh or irritating taste and aroma.

There has thus developed a need for a system for rendering hot onions sufficiently mild to facilitate their use in salads, sandwiches, and similar applications in which the use of sweet onions is preferred.

The treatment of food products to extract volatile components is well known. For example, various fruit and vegetable products have been subjected to drying treatments to remove water. The resultant dried products are useful because of prolonged storage life and light weight. The drying techniques may involve treatment under vacuum conditions in frozen or unfrozen states or long exposure to an air stream under warm conditions.

In other foodstuff treatments, such as disclosed in U.S. Pat. Nos. 3,717,472 and 3,997,685, desirable volatile substances are removed from products such as coffee and tea by vacuum treatment employing condensing traps. The substances recovered from the traps are useful as flavorants for other food products.

U.S. Pat. No. 3,607,316 discloses the dehydration of onions by vacuum treatment which removes substantially all water and other volatile substances. Because of co-distillation effects and the extensive nature of vacuum dehydration, it is quite likely that desirable flavorants and odorants are removed from the onions.

U.S. Pat. No. 4,034,118 to Martin discloses a process for achieving a mellowing or sweetening effect in onions without causing dehydration or loss of desirable flavor components. The Martin process involves the treatment of slices of onion with vinegar under refrigerated conditions for several days.

The aforesaid treatments of onions and other food products are difficult and time-consuming, and require expensive specialized equipment.

It is accordingly an object of the present invention to provide a process for causing onions to become mellower and sweeter.

It is another object of this invention to provide an onion-treating process as in the foregoing object which does not remove desirable flavor components or large amounts of water.

It is a further object of the invention to provide a process of the aforesaid nature which can be accomplished relatively quickly and with inexpensive equipment.

These and other beneficial objects and advantages will be apparent from the following description.

SUMMARY OF THE INVENTION

The above and other beneficial objects and advantages are accomplished in accordance with the present invention by a process comprising placing an onion in whole or comminuted form in a chamber where the onion is subjected to a critically controlled level of reduced pressure for a controlled period of time at a predetermined temperature. By virtue of said process, undesirable volatile substances are evaporatively removed from the onion without removal of desired substances or removal of excessive quantities of water.

DESCRIPTION OF THE PREFERRED EMBODIMENT

The chamber or vessel utilized in the practice of this invention should be strong enough to resist implosion under a pressure gradient to about 14 lbs./sq. in., and should be chemically inert to onions. Suitable vessels will be of generally rounded shape and preferably constructed of aluminum, glass, stainless steel or engineering grade plastics such as polycarbonate, polyacetal, polyester and polyamide. The chamber is required to have a large opening port to permit the entrance and removal of onions, and a closure having sealing means such as a gasket or O-ring to achieve air-tight sealing of said closure with said port. An exhaust fitting such as a hose connection tube is associated with the chamber, and may be located either in said closure or on a sidewall on the chamber, or elsewhere. A valve may be associated with the connection tube to control the vacuum and admit air to break the vacuum in the chamber. The chamber preferably contains an air-permeable support member such as a porous plate, screen, or equivalent structure. The purpose of said support member is to permit placement of the onions or pieces thereof in a manner permitting unrestricted removal of volatiles from all sides of the pieces of onion, including the underside.

The means for applying a vacuum to the chamber may be a conventional mechanical pump capable of generating high vacuum, or a water aspirator eductor device that generates low vacuum. The degree of vacuum may be expressed in terms of the height in millimeters or inches of a column of mercury which the given pressure (vacuum) will support, referred to zero pressure. Atmospheric pressure is generally used as a reference, the pressure of the standard atmosphere being 760 millimeters of mercury. Therefore, using atmospheric pressure as a reference, an absolute pressure of 245 millimeters of mercury would be expressed as 515 millimeters of vacuum. Measurement of moderate vacuums may be achieved with liquid column gages, diaphragm gages, bellows gages and bourdon-spring gages. Although mechanical pumps can generate vacuums below 1 mm Hg, any condensible volatile substances must be prevented from going through the pump. Otherwise, the sealing oil employed in the pump will absorb the volatile substances, with adverse effect to the pump. Removal of such volatiles is generally achieved by interposing a cold condensation trap between the pump and the source of the volatile substances.

Water aspirator devices are available which can be connected to a kitchen faucet and operated to generate a vacuum in the range of 50-100 mm Hg. Such devices, sometimes referred to as eductors, are very inexpensive and do not need to be protected from volatiles by way of an intervening trap. In their manner of operation, the aspiration stream enters a venturi zone of the aspirator wherein a low pressure is generated by a high velocity stream of water. The aspiration stream is thereby blended into the stream of water. In the case of the process of the present invention, the use of a water aspirator device to generate the requisite vacuum is particularly preferred because it affords the further advantage of disposing of the noxious volatiles derived from the onion.

A hose having a wall thickness sufficiently sturdy to resist collapse under vacuum conditions is employed to join the water aspirator to the chamber. The onions to be treated are preferably sliced into sectors thinner than about $\frac{1}{4}''$ and are randomly placed in the chamber, preferably employing the aforesaid porous support plate. The onion-containing chamber should be maintained at ambient temperature during vacuum treatment. The duration of application of vacuum is dependent upon the degree of vacuum applied, the thinness of the onion slices, the amount of onions in the chamber, and the intensity of treatment effect desired.

In general, it has been found that a treatment of 30 to 45 minutes duration employing a water aspirator on a kitchen sink faucet is adequate to achieve the desired results. The preferred extent of vacuum treatment is such that the onions undergo a weight loss in the range of 1% to 3%. Much of the lost weight is attributable to water. However, it has been found that, at weight reductions less than about 1%, the pungency of the onion is not appreciably reduced. At weight reductions greater than about 3%, desirable flavor characteristics of the onion are lost. When the onion to be treated is in whole, uncut form, a 24 hour duration of vacuum treatment is generally required to achieve the sought results. Large industrial size vessels would generally be employed in the treatment of large quantities of whole onions prior to delivery to retail outlets. In still further approaches, moderately-sized chambers could be utilized by the retailer for the treatment of whole or sliced onions.

After the onions have been subjected to the aforesaid process of this invention to improve sweetness, compounds may again form upon ageing in a household food refrigerator, which impart harsh flavor and lachrymator properties. However, re-application of the vacuum process of this invention will reverse the ageing effect to restore the sweet-tasting characteristics of the onion.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for improving the taste characteristics of an onion comprising:
    a) comminuting an onion into slices having at least one dimension smaller than $\frac{1}{4}''$,
    b) disposing a multitude of said slices within a vacuum chamber in a manner such that space exists between said slices,
    c) applying a vacuum treatment to said chamber using a water aspirator and maintaining said vacuum until the slices undergo a weight loss between 1% and 3%, and
    d) removing the thus treated slices from said chamber.

2. The process of claim 1 wherein said onions are Vidalia onions.

* * * * *